A. LANGELLIER.
Car-Couplings.
No. 144,624.  Patented Nov. 18, 1873.
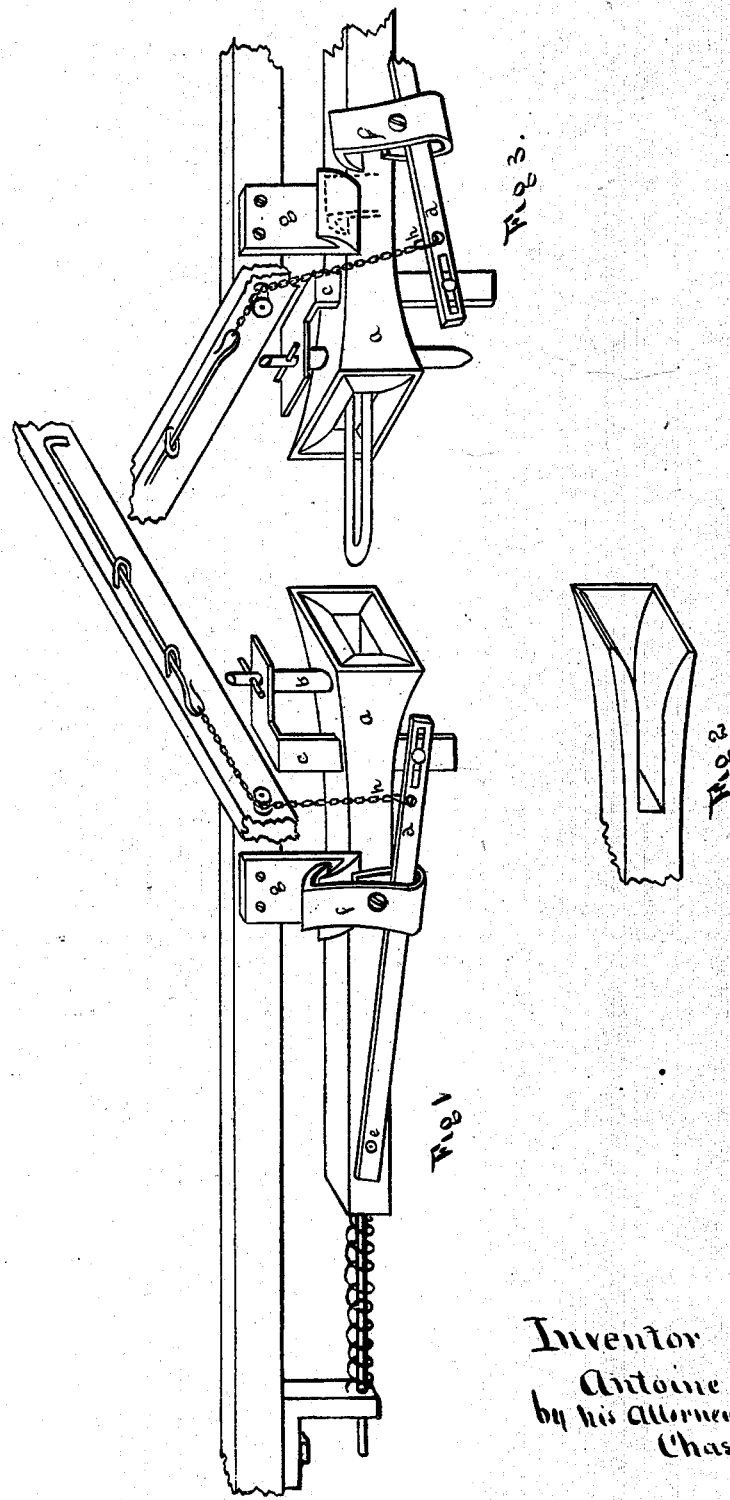

UNITED STATES PATENT OFFICE.

ANTOINE LANGELLIER, OF CONCORD, NEW HAMSHIRE.

IMPROVEMENT IN CAR-COUPLINGS.

Specification forming part of Letters Patent No. 144,624, dated November 18, 1873; application filed June 6, 1873.

*To all whom it may concern:*

Be it known that I, ANTOINE LANGELLIER, of Concord, in the county of Merrimack and State of New Hampshire, have invented certain Improvements in Car-Couplings; and the following is a full and complete description thereof, reference being had to the accompanying drawings.

The object of my invention is to provide a self-acting coupling, by which the danger of being caught between the bunters of cars may be entirely avoided.

At $a$, Figure 1, is shown a part of the coupling attached to and forming part of the draw-bar, having an opening to receive the link, of the form shown in section, Fig. 2. The pin $b$ is firmly and permanently attached to an iron frame, $c$, which slides freely up and down, passing through the side of the draw-bar, or in grooves or slides attached thereto, and the lower end of said frame $c$ is attached to a bar, $d$, by the set-screw and slot arranged at the end of said bar, as shown. The bar $d$ swings upon a pivot at $e$, and is provided with a catch, $f$, and attached to the frame of the car is another catch, $g$. A chain attached to the bar at $h$, and passing up and along the end of the car, enables the bar to be raised, and with it the frame and pin, thus uncoupling the car.

When the bar is pulled up the catch $f$ engages with the catch $g$ on the car-frame, and the pin is held up in the position shown in Fig. 1.

As the cars to be coupled come together, they meet with sufficient force to press back their respective draw-bars, and the catch $f$ slides back in the catch $g$ till they become disengaged, and the bar and pin drop into the position shown in Fig. 3, and the car is coupled.

The opening in the draw-bar is so made, as shown in Fig. 2, that the link, when pressed back into it, will be held straight, and in proper position to enter the opening in the draw-bar of the car to be coupled on; and, by the use of crooked or curved links, my coupling may be adapted to cars varying in height.

I claim—

The car-coupling composed of the draw-bar $a$, the pin $b$, the frame $c$, the bar $d$, and catches $f$ and $g$, adjusted and combined to operate as and for the purposes set forth.

ANTOINE LANGELLIER.

Witnesses:
C. HUTCHINS,
H. M. LANE.